W. J. PHELPS.
MEANS FOR APPLYING SOLDER RINGS TO CAN CAPS.
APPLICATION FILED FEB. 11, 1908.
959,163.
Patented May 24, 1910.
2 SHEETS—SHEET 1.
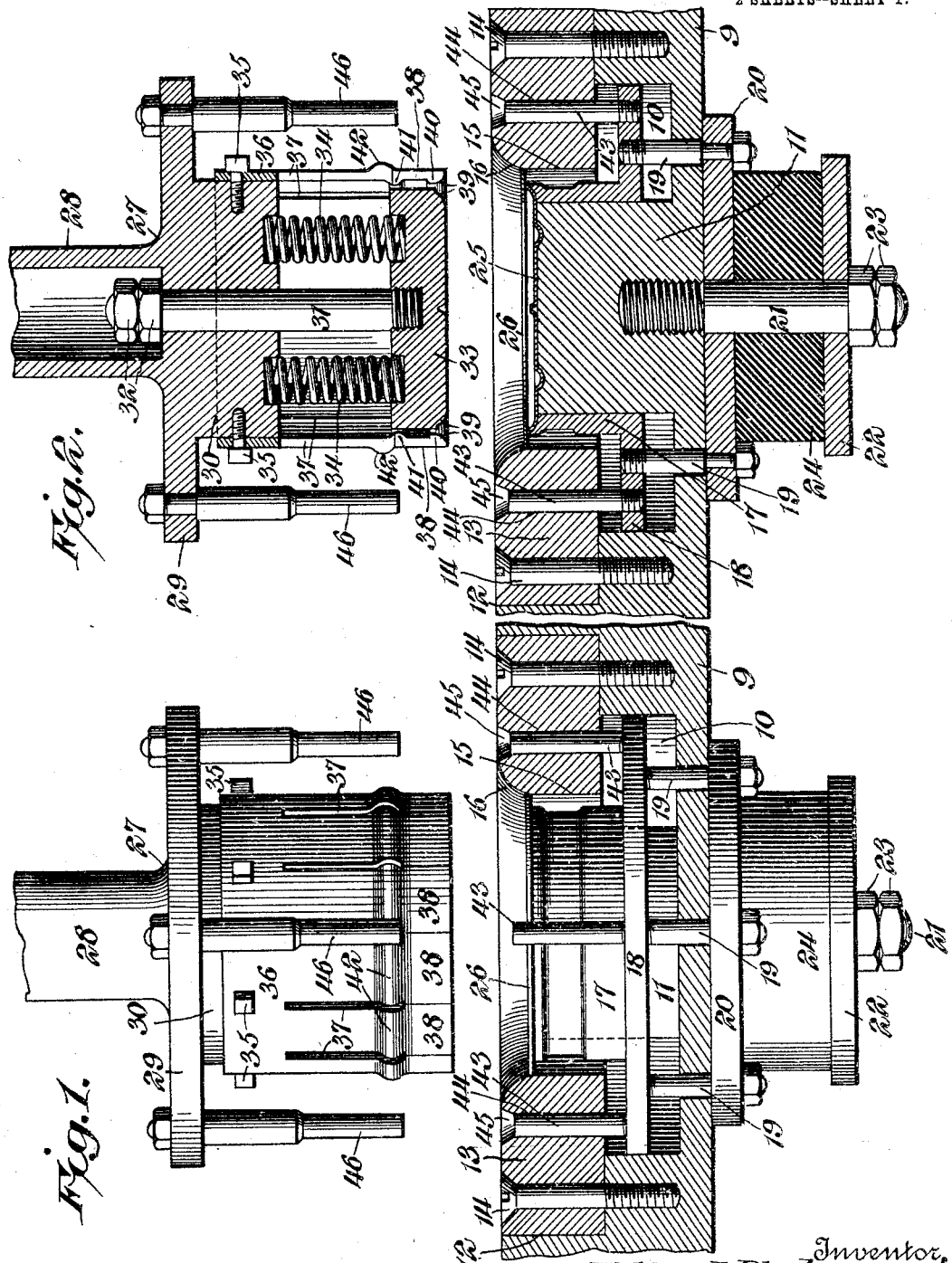
Witnesses
Howard D. Orr
Inventor,
Walter J. Phelps,
By E. G. Siggers
Attorney W. J. PHELPS.
MEANS FOR APPLYING SOLDER RINGS TO CAN CAPS.
APPLICATION FILED FEB. 11, 1908.
959,163.
Patented May 24, 1910.
2 SHEETS—SHEET 2.
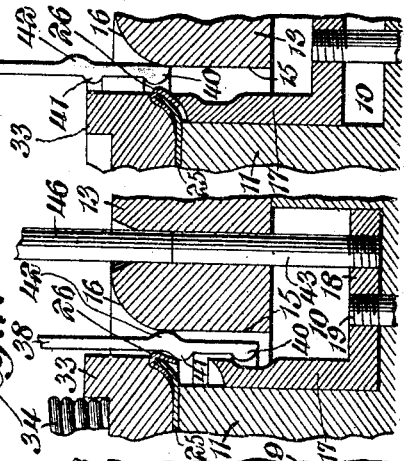
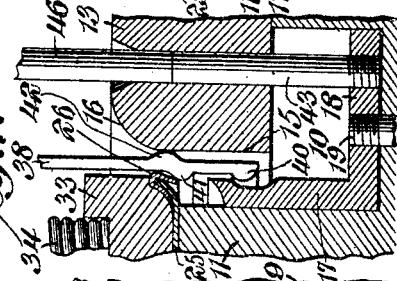
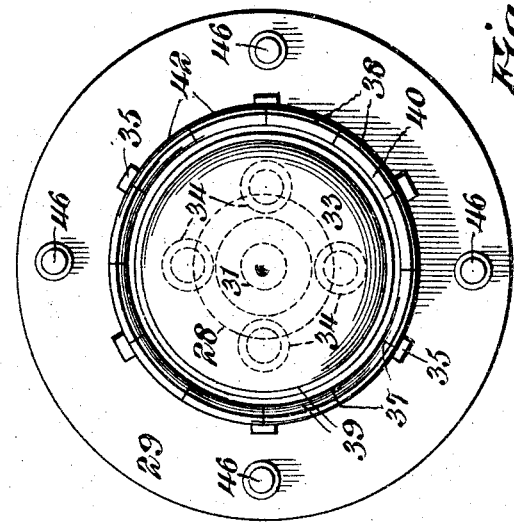
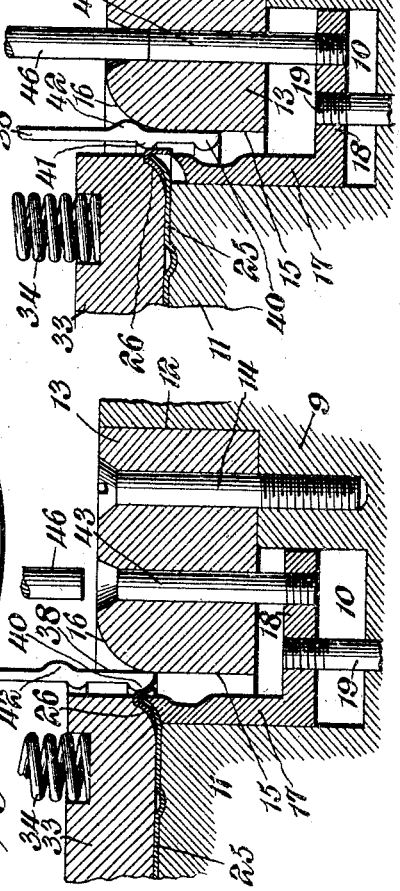
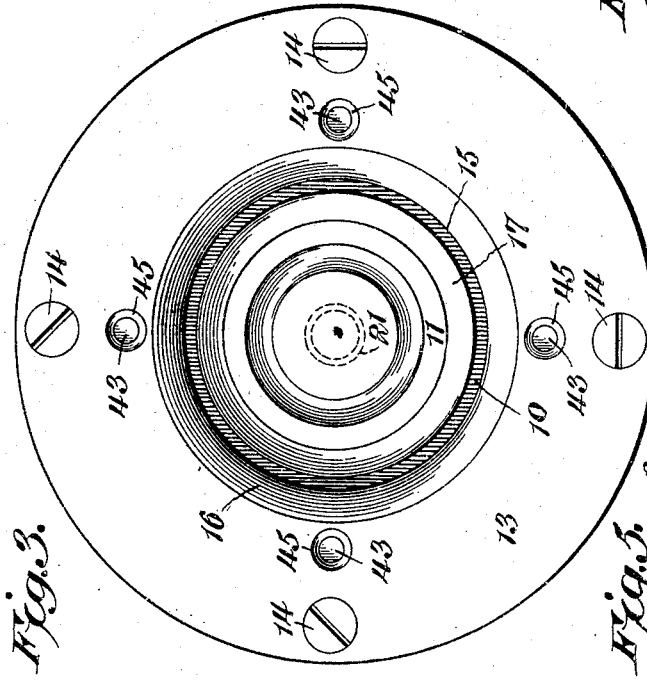
Walter J. Phelps, Inventor,
Witnesses
Howard D. Orr
B. G. Foster
By E. G. Siggers
Attorney

UNITED STATES PATENT OFFICE.

WALTER J. PHELPS, OF BALTIMORE, MARYLAND.

MEANS FOR APPLYING SOLDER RINGS TO CAN-CAPS.

959,163.  Specification of Letters Patent.  Patented May 24, 1910.

Application filed February 11, 1908. Serial No. 415,424.

*To all whom it may concern:*

Be it known that I, WALTER J. PHELPS, a citizen of the United States, residing at Baltimore, in the State of Maryland, have invented a new and useful Means for Applying Solder Rings to Can-Caps, of which the following is a specification.

Can caps having solder applied to their edges or margins have become quite an important article of commerce in the canning industry, and of the various forms proposed or actually in use, that in which a continuous ring of solder is clamped over the edge of the cap is preferred by the trade. There is, however, considerable expense in producing this form of cap, due partially to the waste in the production of the solder rings and partially to the cost of applying the rings to the cap, the mechanism heretofore employed being expensive and intricate, requiring a series of sets of die mechanisms with a consequent series of separate steps in the production of the articles in question.

The primary object of the present invention is to provide novel, very simple and thoroughly practicable means for effectively applying the rings to the caps by a single operation, said means producing as neat and finished an article as the expensive mechanism now in use.

While this invention is particularly useful in connection with the ring producing means disclosed in my co-pending applications filed Jan. 23, 1908, Serial Nos. 412,312, and 412,314, it is not necessarily limited to use with the same, but will successfully operate on rings regardless of how said rings are made.

The preferred embodiment of the invention, and one that has proven entirely satisfactory, is illustrated in the accompanying drawings, but it is to be understood that many changes and modifications may be made from the disclosed structure without departing from the spirit or scope of the invention.

In said drawings:—Figure 1 is a view in elevation of the mechanism, the supporting means and a portion of the female die being illustrated in section. Fig. 2 is a vertical sectional view through the mechanism. Fig. 3 is a top plan view of the female die. Fig. 4 is a bottom plan view of the male die. Figs. 5–8 inclusive are detail sectional views, illustrating the different positions of the die mechanism during the application of a ring to the cap.

Similar reference numerals designate corresponding parts in all the figures of the drawings.

In the embodiment illustrated, a suitable support 9 is employed for the female die mechanism, and this support has a chamber 10, in which is located an upstanding bed 11, circular in cross section. Secured in a recessed seat 12, in the upper side of the support 9, is a centering ring 13 fastened in place by screws 14 or other suitable devices and having the bed 11 disposed concentrically therein but spaced therefrom. The lower portion 15 of the inner wall of the ring is vertically disposed while the upper portion is beveled or flared, as shown at 16.

A combined supporting and bumping ring 17 is slidably mounted on the bed 11, and operates in the space between the same and the centering ring 13. This ring 17 has an outstanding annular flange 18 at its lower end that is located in the chamber 10, and secured to said flange are depending bolts 19 that slidably pass through the support 9 and are secured at their lower ends to a washer disk 20 located below the support. This washer disk slides upon a vertically disposed stud 21 threaded into the bed 11 and another washer 22 is adjustably mounted on the lower end of the stud, being held in position by adjustable jam nuts 23. Interposed between the two washers, is a cushion spring preferably in the form of a rubber block 24, though it will be evident that a steel spring may be employed, if desired. Thus it will be seen that the combined supporting and bumping ring 17 is yieldingly supported and may be forced downwardly. Its upper edge is normally located in line with an upper end of the bed 11 and the two are formed into the contour of the upper face of a cam cap, one of which is shown in place thereon, and is designated 25. In other words, it will be noted particularly by reference to Fig. 2 that the can cap is placed upon the bed and ring upside down, that said cap projects beyond the bed, but that the projecting margins are normally supported by the ring. The bore of the vertical portion 15 of the centering ring 13 is substantially the diameter of the solder ring to be applied, one of said solder rings being illustrated in position and designated 26. Consequently by reference to said Fig. 2, it will be evident that if a can cap 25 is placed in the mechanism, it will center itself and if a ring 26 is afterward placed therein, said ring will be centered upon the upstanding edge of the cap.

The male die consists of a suitable carrier 27 movable toward and from the female die or bed, and in the present embodiment is shown as having a hollow stem 28 with an outstanding annular flange 29 and a depending boss 30. A stud bolt 31, slidably passing through the boss, has its upper end located in the hollow stem 28, its downward movement being limited by adjusting nuts 32. Secured to the lower end of the stud bolt is a bumper die 33, the lower face of which is formed to correspond substantially to the adjacent face of the can cap. Springs 34, are interposed between the bumper die 33 and the boss 30, said springs thus yieldingly holding the bumper die in its lowermost position. Fastened to the boss 30 by suitable set screws 35 and surrounding said boss, is a combined drawing, shaping and tucking ring 36, the lower portion of which is longitudinally slitted, as shown at 37, forming an annular series of jaws 38, the lower ends of which surround the bumper die 33. It will be noted that the inner sides of the lower ends of the jaws and the outer margins of the bumper die are correspondingly rounded, as shown at 39, the rounded portions of the jaws being formed upon enlargements 40 on the inner side of said jaws. Other enlargements 41 are formed above the enlargements 40, and outstanding enlargements 42 are located upon the outer sides of the jaws slightly above the enlargements 41.

Referring again to the combined supporting and bumping ring 17, it will be noted that the flange 18 thereof is provided with upstanding stems 43, which are slidably engaged in sockets 44 in the centering ring 13, the upper ends of said sockets being preferably enlarged, as shown at 45. The outstanding flange 29 of the carrier 27 has secured thereto depending stems 46, the lower ends of which aline with the sockets 44 and consequently engage the upper ends of the stems 43 when the carrier moves downwardly.

The operation of the mechanism is substantially as follows: Referring first to Fig. 2, it will be noted that after a cap 25 has been placed in position, the ring 26 to be applied thereto is inserted, and in this connection, it is an important feature to be noted that neither the cap nor the ring have to be accurately placed by the operator, for they will center themselves. Moreover the ring does not have to be bent or channeled, though channeled rings can be employed. When the parts are positioned, as shown, the carrier 27 is moved downwardly by any suitable means well known in the art, and referring to Fig. 5, it will be noted that the surfaces 39 will engage the inner and outer margins of the ring 26 and correspondingly bend the same over the edge of the cap. While these surfaces 39 preferably engage the ring simultaneously, experience has demonstrated that this is not absolutely necessary. The bumper die 33 will bed itself and thus not only bend the inner margin of the ring to the contour of the upper face of the margin of the cap, but will clamp the two together, and will also clamp the cap to the bed 11. Then while the inner margin of the rig and cap are so clamped, the following operations take place. The combined drawing, shaping and tucking ring 36 continues its downward movement, and this can occur because of the yielding connection between the bumper die 33 and the carrier 27. As said downward movement takes place, the enlargements 40 of the jaws 38 will cause the outer margin of the ring to be drawn down over the edge of the cap to a vertical position as shown in Fig. 6. As the downward movement of the carrier 27 continues, the lower ends of the stems 46 will strike the upper ends of the stems 43, thus moving the same downwardly, and consequently moving the combined supporting and bumping ring 17 in a corresponding direction, compressing the spring cushion 24. As a result, the upper end of said ring 17 will be carried away from the under margin of the cap 25, which, as already stated and as shown, projects beyond the bed 11. At this point, and as shown in Fig. 6, the outer projections 42 of the jaws will ride against the tapered surface 16 of the centering ring 13. Consequently said jaws will be moved inwardly, or in other words, the lower end of the ring 36 will be contracted. As a result, and as shown in Fig. 7, the downwardly turned outer margin of the solder ring will be tucked inwardly toward the under margin of the cap, the projections 40 of the jaws being received in a suitable recess formed in the outer side of the ring 17. By means of this inward tucking of the outer margin of the solder ring, the outer or lower edge of said ring will be carried inside the vertical path of movement of the upper outer edge of the ring 17. The carrier now is elevated, and as it moves upwardly, the spring cushion 24 reacts to return the ring 17. The upper end of this ring will therefore engage the inwardly tucked margin of the solder ring, and will clamp the same securely against the under face of the margin of the cap, this final clamping action being obtained before the bumper die 33 rises, as will be noted by reference to Fig. 8. Thus it will be seen that a flat ring is bent around and clamped upon the margin of a can cap by a single operation of the die mechanism without removing the cap from its original support. Outside of the rapidity with which the applying operation may be performed there are a number of advantages for the particular structure disclosed. In the first place, almost all the parts are circular in cross section, so that they may be cheaply produced. These parts are moreover all accessible, and are very simple in their character. A number of them furthermore perform, each a plurality of functions, thus the bumper 33 not only serves to bring the inner margin of the solder ring to the shape of the margin of the can cap, but it clamps the same thereto, and holds the cap in place, while the remainder of the operation is being performed.

The ring 17 constitutes a centering or positioning device for the cap, it acts as a support for the margin of the cap while the ring is being drawn over the edge of said cap, and it also constitutes a bumper for finally applying the outer margin of the ring to said cap. In connection with its action as a support, it may be stated that while on heavy grades of tin, a support for the margin of the cap has been found unnecessary, where the lighter material is used, as for instance that employed in the manufacture of ordinary tin cans, experience has demonstrated that if the margin of the cap is not supported, the drawing action of the solder ring over the edge of the cap will tend to straighten the margins of the cap. This tendency, however, is entirely obviated by maintaining the ring 17 as a support until the drawing action is substantially complete. The ring 13 also performs a plurality of functions. In the first place, it acts as a centering or positioning device for the solder ring 26, as shown in Fig. 2. But further than this, as illustrated particularly in Figs. 5 and 6, it constitutes a backing for the jaws 38, effectively preventing them from spreading while they are bending the solder rings downwardly. It will be clear that this is an important feature when it is considered that the jaws 38 must be of yielding material in order to permit them to be moved inwardly. In addition to the above described functions, the ring also constitutes means for moving the jaws inwardly, as shown in Fig. 7. From the above, it will be clear therefore that not only are the objects mentioned in the preliminary portion of the specification secured, but there are decided advantages for the particular form of construction disclosed.

By the term "flat solder ring" I mean a solder annulus or endless ring, flat in cross section, and expressly disclaim a wire solder ring such as is commonly employed.

Having thus fully described my invention, what I claim as new, and desire to secure by Letters Patent, is:—

1. In mechanism of the character set forth, the combination with a bed, of means for positioning a disk thereon with its margin projecting beyond the bed, means for positioning a flat ring with its inner margin overlapping the margin of the disk and its outer margin projecting beyond the edge of the disk, and means for successively clamping the inner margin of the ring to the disk, bending the outer margin of the ring across the edge of the disk, bending the margin of the ring inward, and clamping both margins of the ring against the opposite sides of the disk.

2. In mechanism of the character set forth a bed plate adapted to receive and center a disk and ring of larger diameter than said disk, a bumper die movable into engagement with the disk, adapted to hold the inner margin of the disk, means movable past the periphery of the disk and engaging with the projecting edge of the ring to force the margin of the ring downward and inward, and means movable against said inturned margin for forcing said margin against the adjacent face of the disk.

3. In mechanism of the class described, a concave bed adapted to support a concave disk of larger diameter than the bed, a centering ring spaced from but surrounding the bed and adapted to center a solder ring upon the upturned edge of the disk, a bumper die movable toward the bed for holding the solder ring and disk clamped thereon, and means for bending the projecting margin of the ring over the edge of the disk and for then clamping said overturned edge against the opposite margin of the disk.

4. In mechanism of the character set forth, the combination with a bed adapted to center and hold a disk, of a bumper die movable to and from the disk to hold a solder ring against the margin of the disk with the margin of the ring projecting beyond the disk, a drawing ring movable past the periphery of the disk and engaging with the projecting edge of the solder ring to force it downward and inward, and a supporting and bumping ring movable into engagement with the inwardly bent margin of the solder ring for forcing the ring inward against the opposite face of said disk.

5. In mechanism of the class described, the combination with a bed adapted to receive a disk-like article, of a bumper die movable into engagement with the article to hold one margin of a solder ring against the margin of the article to which the ring is to be applied, a drawing ring greater in diameter than the diameter of said bed and movable past the edge of the article to engage the outer margin of the ring and bend it downward, means surrounding the bed and supporting the circumferential margin of the article, mechanism for moving said supporting means away from contact with the margin of the disk after the exterior margin of the solder ring has been bent downward by said drawing ring, means for turning in the margin of the ring, and mechanism for again moving said supporting means upward to compress said inturned margin of the ring against the margin of the disk.

6. In mechanism of the class described, the combination with a bed adapted to receive a disk-like article and a bumper die movable into engagement with the article and adapted to hold the inner margin of a solder ring against the margin of the article to which the ring is to be applied, of a drawing and tucking ring surrounding the bumper die and of larger diameter than the bed, said drawing ring being movable past the edge of the article to engage and bend downward the outer margin of the solder ring, a supporting ring surrounding the bed and normally supporting the exterior margin of the article, means for moving said supporting ring away from contact with the margin of the disk after the exterior margin of the solder ring has been bent downward, means for turning in the margin of the solder ring, and means for again forcing said supporting ring upward to compress said solder ring against the margin of the disk.

7. In mechanism of the character set forth, the combination with means for clamping the inner margin of a ring to one side of an article, with the outer margin of the ring projecting beyond the article, of means for bending the exterior margin of the ring over the edge of the article, means for supporting the margin of the article during such bending operation, means for moving the support away from the margin, means for tucking the outer margin of the ring inwardly toward said margin of the article while the support is removed, and means for returning the support to clamp the inturned margin of the ring against said article.

8. In mechanism of the character set forth, the combination with a supporting bed for a cap, of a bumper die movable into and out of coaction with the bed to clamp the cap and simultaneously clamp a ring to the cap, and means surrounding the bumper die and movable with relation to the same and past the cap while the bumper die is in coaction with the bed to bend the ring around the edge of the cap.

9. In mechanism of the character set forth, the combination with a bed, of a bumper die movable into and out of coaction with the bed to clamp a cap and ring together upon the bed, means movable with the bumper die and relatively to the same for bending the outer margin of the ring over the edge of the cap and inward toward the opposite face of the same, and means movable relatively to the bed to clamp the outer margin of the ring against the opposite face of the cap.

10. In mechanism of the character set forth, the combination with a bed, of a bumper die movable into and out of coaction with the bed to clamp a cap and ring together upon the bed, means movable with the bumper die and movable with respect thereto for bending the outer margin of the ring over the outer edge of the cap, and means for contracting said bending means when the bumper die is in coaction with the bed to bend the outer margin inwardly.

11. In mechanism of the character set forth, the combination with a bed forming a cap support, of means for centering a ring on the edge of a cap placed on the support, a carrier movable toward and from the bed, a bumper die yieldingly mounted on the carrier and movable into coaction with the bed to clamp the inner margin of the ring against the cap, and a drawing ring secured to the carrier and movable with and with respect to the bumper die, said drawing ring engaging the outer margin of the ring to bend the same over the edge of the cap.

12. In mechanism of the character set forth, the combination with a bed forming a cap support, of means for centering a ring on the edge of a cap placed on the support, a bumper die movable into and out of coaction with the bed to clamp the inner margin of the ring against the cap, a sectional contracting drawing ring movable with the bumper die and engaging the outer margin of the ring to bend the same while the bumper die holds the inner margin, and means for contracting the drawing ring to tuck the bent margin inwardly.

13. In mechanism of the character set forth, the combination with a bed forming a cap support, of means for centering a ring on a cap placed on the bed, a carrier movable toward and from the bed, a bumper die yieldingly mounted on the carrier and movable into coaction with the bed to clamp the inner margin of the ring against the cap, and hold said cap upon the bed, a sectional contracting drawing ring secured to the carrier and movable with and with respect to the bumper die, said drawing ring operating against the outer margin of the ring to bend the same while the inner margin is clamped to the cap, and means for contracting the ring to turn said outer margin inwardly after it has been so bent.

14. In mechanism of the character set forth, the combination with a bed constituting a support for a cap, of a centering ring surrounding the bed in spaced relation thereto and constituting means for centering a ring upon the cap with its outer margin projecting beyond the edge thereof, a carrier movable toward and from the bed, a bumper die yieldingly mounted on the carrier and movable into and out of coaction with the bed to bend the inner margin of a ring against the cap and hold it and the cap upon the bed, a contracting drawing ring secured to the carrier and surrounding the bumper die, said drawing ring comprising a plurality of inwardly movable jaws that operate between the centering ring and the bed, said jaws bending the outer margin of the ring over the edge of the cap, and projections carried by the outer sides of the jaws and operating against the centering ring to force the jaws inwardly and tuck the outer margin of the ring inwardly.

15. In mechanism of the character set forth, the combination with a cap holding bed, of means for centering a ring on a cap placed on the bed, means for clamping the inner margin of the ring to one side of the cap and holding said cap on the bed, means movable in one direction for bending the outer margin of the ring over the edge of the cap while said ring and cap are so held, and means movable in an opposite direction for clamping the outer margin of the ring against the opposite side of the cap while the cap is held upon the bed.

16. In mechanism of the character set forth, the combination with a cap holding bed, of means for centering a ring against a cap placed on the bed, means for clamping the inner margin of the ring to one side of the cap and holding the cap against the bed, means movable in one direction for bending the outer margin of the ring over the edge of the cap, means for supporting said edge of the cap during the bending operation, means for moving the support away from said edge of the cap, and means for returning the support to clamp the outer margin of the ring against the opposite side of the cap while said cap is held upon the bed.

17. In mechanism of the character set forth, the combination with a cap holding bed, of means for centering a ring on a cap held against the bed, means for clamping the inner margin of the ring to one side of the cap and holding said cap against the bed, means for bending the outer margin of the ring over the edge of the cap, means for supporting the edge of the cap during the bending operation, means for moving the support away from said edge of the cap, means for tucking the outer margin of the ring inwardly toward the opposite face of the cap, and means for returning said support to clamp said tucked margin against said opposite face.

18. In mechanism of the character set forth, the combination with a cap holding bed, of a bumper die for clamping the inner margin of a ring to a cap placed on the bed and holding the two upon said bed, means movable with the bumper die and movable with respect to the same to bend the ring over the edge of the cap, means for actuating the bending means to tuck the outer margin inwardly toward the bed, and other means clamping the said margin against the cap while the inner margin is still clamped.

19. In mechanism of the character set forth, the combination with a stationary bed constituting means for supporting a cap with the edge projecting beyond the same, of a stationary centering ring surrounding the bed, a reciprocatory supporting and bumping ring slidably mounted on the bed within the centering ring, means for yieldingly maintaining the combined supporting and bumping ring in a predetermined position to support the edge of a cap placed on the bed, a reciprocatory carrier movable toward and from the bed, a bumper die yieldingly mounted on the carrier and movable into and out of coaction with the bed and combined supporting and bumping ring, a combined drawing, shaping and tucking ring secured to the carrier and surrounding the bumper die, said ring consisting of a plurality of inwardly movable jaws that operate between the supporting and bumping ring and the centering ring, said jaws having means that engage the centering ring to cause the inward movement of the jaws, and means carried by the carrier for moving the combined supporting and bumping ring upon the bed when the bumper die is in coaction with the bed and the combined drawing, shaping and bumping ring is operating between the bed and centering ring.

20. In mechanism of the character set forth, the combination with a supporting bed for a cap, of means for centering a ring against a cap placed on the bed, with its outer margin projecting beyond the edge of the cap, means for bending the inner margin of the ring to the shape of one face of the margin of the cap and clamping it thereto, and means for effecting the following operations upon the outer margin of the ring while the inner margin is so clamped, to-wit: bending said outer margin over the edge of the cap, turning the said margin inwardly toward the opposite face of the margin to that against which the inner margin is held, and finally clamping said outer margin against and bending it to the contour of said opposite face.

21. In mechanism of the character set forth, the combination with a concave bed for supporting a concave cap, and a centering ring surrounding the bed but spaced therefrom for supporting a solder ring upon the upturned edge of said cap, of a bumper die movable into and out of coaction with the bed for clamping the inner margin of the ring to the cap and holding both upon the bed, and means surrounding the bumper die and movable into the space between the bed and centering ring for bending the margin of the solder ring over the edge of the cap.

22. In mechanism of the character set forth, the combination with means for supporting a concave cap with its edge in upstanding relation, of a surrounding centering ring spaced from the supporting means to position a solder ring with its intermediate portion resting upon said edge, mechanism for bending the inner margin of the solder ring into contact with the cap and holding it in place thereon, mechanism operating between the supporting means and the centering ring for bending the outer margin of the ring downward, and mechanism for clamping the inwardly-bent outer margin against the under face of the cap.

23. In mechanism of the character set forth, the combination with a support for a cap and a ring surrounding the same and forming part of said support, of a ring-positioning device surrounding the support in spaced relation thereto, means movable into and out of co-action with the support for clamping the inner margin of the solder ring to one face of the cap, mechanism operating in the space between the support and positioning device to bend the outer margin of the solder ring across the edge of the cap, means whereby the outer portion of the support shall be moved away from the cap upon the movement of the ring-bending means past the cap, and means whereby upon a return of said bending means to its first position, said movable section of the support shall return and clamp the bent margin of the solder ring against the inner face of the cap.

24. In mechanism for applying marginal rings to articles, a central fixed bed smaller than the article to which the ring is to be applied, a centering ring surrounding the bed but spaced therefrom, a supporting ring surrounding and forming part of the bed, normally held flush with the face of the bed but movable out of this position, a yieldable bumper die movable against the article held on the bed, a sectional drawing ring surrounding the bumper die and movable past the same and into the space between the supporting ring and the centering ring, projections on the inner face of the drawing ring engaging with the margin of the solder ring to bend it inward around the disk, means whereby the supporting ring shall be forced out of its supporting position after the projections have engaged a solder ring to bend it downward, and means whereby when the said sections are moved out of the centering ring the supporting ring shall rise and clamp the margin of the solder ring against the adjacent face of the article.

25. In combination with a stationary bed constituting means for supporting an inverted can cap with its marginal edge upturned, a stationary centering ring surrounding the bed for centering a solder ring or annulus flat in cross section upon the said edge of the cap with the outer margin of the ring projecting beyond the edge of the cap, and means for bending the inner and outer margins of the ring around the opposite faces of the margin of the cap, while the latter remains upon the said bed.

26. In combination with a stationary bed constituting means for supporting an inverted can cap with its marginal edge upturned, means for centering an endless solder ring or annulus flat in cross section upon the said edge of the cap with the outer margin of the ring projecting beyond the said edge of the cap, and means for bending the inner and outer margins of the ring around the opposite faces of the margin of the cap.

27. In combination with a stationary bed constituting means for supporting an inverted can cap with its marginal edge upturned and projecting beyond the bed, a stationary ring beyond the bed for centering a solder ring or annulus flat in cross section upon the said edge of the cap with the outer margin of the ring projecting beyond the edge of the cap, a movable supporting ring surrounding the bed for supporting the projecting marginal edge of the cap by bearing against the lower face thereof, and means for bending the inner and outer margins of the ring against the opposite faces of the cap.

28. In combination with a stationary bed constituting means for supporting an inverted can cap placed upon the same with its marginal edge upturned and projecting beyond the bed, a movable supporting ring surrounding the bed and having its upper edge shaped to conform to and bear against the lower face of the outer edge of the can cap and form a support for the same, a bumper die movable into and out of coaction with the bed to bend the inner edge of the ring around the upper face of the marginal edge of the can cap, and means for bending the outer edge of the ring around the lower face of the marginal edge of the can cap after the movable supporting ring has been moved away from said face.

29. In combination with a stationary bed constituting means for supporting an inverted can cap placed upon said bed with its its marginal edge upturned and projecting beyond the bed, a movable supporting ring surrounding the bed and having its upper edge shaped to conform to and bear against the lower face of the outer edge of the can cap and form a support for the same, a bumper die movable into and out of coaction with the bed to bend the inner edge of the ring around the upper face of the marginal edge of the can cap, and means for bending the outer edge of the ring first downwardly while the movable supporting ring is still in engagement with the said edge of the can cap, and then inwardly after said supporting ring has been moved away from said can cap.

30. In combination with a stationary bed constituting means for supporting an inverted can cap placed upon said bed with its marginal edge upturned and projecting beyond the bed, a movable supporting ring surrounding the bed and having its upper edge shaped to conform to and bear against the lower face of the outer edge of the can cap and form a support for the same, a bumper die movable into and out of coaction with the bed to bend the inner edge of the ring around the upper face of the marginal edge of the can cap, means for moving the supporting ring away from the lower face of the marginal edge of the can cap after the bumper die has been moved into engagement with the upper face of the can cap, and means for first bending the outer edge of the ring downwardly around the edge of the can cap while the supporting ring is in engagement with the lower face of the edge of the can cap, and subsequently bending the said edge of the ring inwardly around and against the lower face of the marginal edge of the can cap after the movable supporting ring has been moved away from said face.

31. In combination with a stationary bed constituting means for supporting an inverted can cap with its marginal edge upturned and projecting beyond the bed, means for centering a flat solder ring upon the said edge of the cap with the outer margin of the ring projecting beyond the said edge of the cap, movable means for engaging with and supporting from below the projecting marginal edge of the can cap, a bumper die movable into and out of coaction with the bed to bend the inner edge of the ring around the upper face of the marginal edge of the can cap, a tucking device, and means for moving the latter into engagement with the outer edge of the ring to tuck or force the said edge down around and against the lower face of the can cap.

32. In combination with a stationary bed constituting means for supporting an inverted can cap with its marginal edge upturned and projecting beyond the bed, means for centering a flat solder ring upon the said edge of the cap with the outer margin of the ring projecting beyond the said edge of the cap, movable means for engaging with and supporting from below the projecting marginal edge of the can cap, a bumper die movable into and out of coaction with the bed to bend the inner edge of the ring around the upper face of the marginal edge of the can cap, a tucking device carried by and movable with the bumper die, and means for moving the latter into engagement with the outer edge of the ring to tuck or force the said edge down around and against the lower face of the can cap.

33. In combination with a stationary bed constituting means for supporting an inverted can cap with its marginal edge upturned and projecting beyond the bed, means for centering a flat solder ring upon the said edge of the cap with the outer margin of the ring projecting beyond the said edge of the cap, movable means for engaging with and supporting from below the projecting marginal edge of the can cap, a bumper die movable into and out of coaction with the bed to bend the inner edge of the ring around the upper face of the marginal edge of the can cap, a tucking device having a series of inwardly movable jaws, and means for moving the latter into engagement with the outer edge of the ring to tuck or force the said edge down around and against the lower face of the can cap.

34. In combination with a stationary bed constituting means for supporting an inverted can cap with its marginal edge upturned and projecting beyond the bed, a stationary centering ring surrounding the bed for centering a flat solder ring upon the said edge of the cap with the outer margin of the ring projecting beyond the said edge of the cap, a movable means engaging with the projecting marginal edge of the cap from below for supporting the latter, a tucking device having a series of inwardly movable jaws, a bumper die movable into and out of coaction with the bed to bend the inner edge of the ring around the upper face of the marginal edge of the can cap, said bumper die carrying the tucking device in its movements, and said tucking device contacting with the centering ring to cause its jaws to be moved into engagement with the outer edge of the solder ring to tuck or force the said edge around and against the lower face of the can cap.

35. In combination with a stationary bed constituting means for supporting an inverted can cap with its marginal edge upturned and projecting beyond the bed, means for centering a flat solder ring upon the said edge of the cap with the outer margin of the ring projecting beyond the edge of the cap, a movable supporting ring surrounding the bed for supporting the projecting marginal edge of the cap by bearing against the lower face thereof, a bumper die movable into and out of coaction with the bed to bend the inner edge of the solder ring around the upper face of the marginal edge of the can cap, means for moving the supporting ring away from the lower face of the marginal edge of the can cap after the bumper die has been moved into engagement with the upper face of the can cap, a tucking device, means for moving the latter into engagement with the outer edge of the solder ring to force said edge downwardly while the supporting ring is in engagement with the lower face of the can cap, said tucking device having a series of inwardly movable jaws which by contact with the stationary centering ring are forced into engagement with the downwardly turned edge of the solder ring so as to tuck or force the said edge around and against the lower face of the can cap after the supporting ring has been moved away from said face, said supporting ring being returned into engagement with the underside of the can cap after the tucking device has moved away so as to compress the solder ring against the lower face of the can cap.

36. In a die for hemming can caps in one operation, the combination of a stationary bed constituting means for supporting an inverted can cap with its marginal edge upturned and projecting beyond the bed, a stationary ring beyond the bed for centering a flat solder ring upon the said edge of the cap with the outer margin of the ring projecting beyond the outer edge of the cap, a movable supporting ring surrounding the bed for supporting the projecting marginal edge of the cap while the outer edge of the solder ring is being downwardly bent over the edge of the cap, means for moving away the said supporting ring while the downwardly bent edge of the solder ring is tucked under the lower edge of the margin of the can cap and between the movable supporting ring and the margin of the can cap, and means for returning the movable supporting ring to its first position so as to compress both margins of the solder ring against both faces of the margin of the can cap, a bumper die movable into and out of coaction with the bed to bend the inner edge of the solder ring around the upper face of the marginal edge of the can cap, said bumper die holding the solder ring and can cap firmly in position until the operation is fully completed.

37. In combination with means for supporting and centering an inverted can cap with its marginal edge upturned, means for centering a solder ring or annulus flat in cross section upon said edge of the can cap with the outer margin of the ring projecting beyond the edge of the cap, and means for bending the inner and outer margins of the solder ring around the opposite faces of the said cap, said means performing its operation with a single stroke and without moving the cap or the ring from their initially-placed positions.

38. In combination with a stationary bed constituting means for supporting an inverted can cap with its marginal edge upturned, a stationary centering ring surrounding the bed and extended above the same for guiding and centering a flat endless solder ring upon the said edge of the cap with the outer margin of the ring projecting beyond the edge of the cap, and means for bending the inner and outer margins of the solder ring around the opposite faces of the cap while the latter is retained upon the said bed in its initially-placed position.

In testimony, that I claim the foregoing as my own, I have hereto affixed my signature in the presence of two witnesses.

WALTER J. PHELPS.

Witnesses:
B. G. Foster,
John H. Siggers.